May 15, 1928.  1,669,833
F. P. McCOLL
MACHINE FOR AND METHOD OF MAKING CAN OPENING
KEYS AND ATTACHING THE SAME
Filed April 6, 1925   6 Sheets-Sheet 1

May 15, 1928. 1,669,833
F. P. McCOLL
MACHINE FOR AND METHOD OF MAKING CAN OPENING
KEYS AND ATTACHING THE SAME
Filed April 6, 1925 6 Sheets-Sheet 2

Inventor
Francis P. McColl
By his Attorneys
Darby & Darby

May 15, 1928.  1,669,833

F. P. McCOLL
MACHINE FOR AND METHOD OF MAKING CAN OPENING
KEYS AND ATTACHING THE SAME
Filed April 6, 1925  6 Sheets-Sheet 3

Inventor
Francis P. McColl
By his Attorneys
Darby & Darby

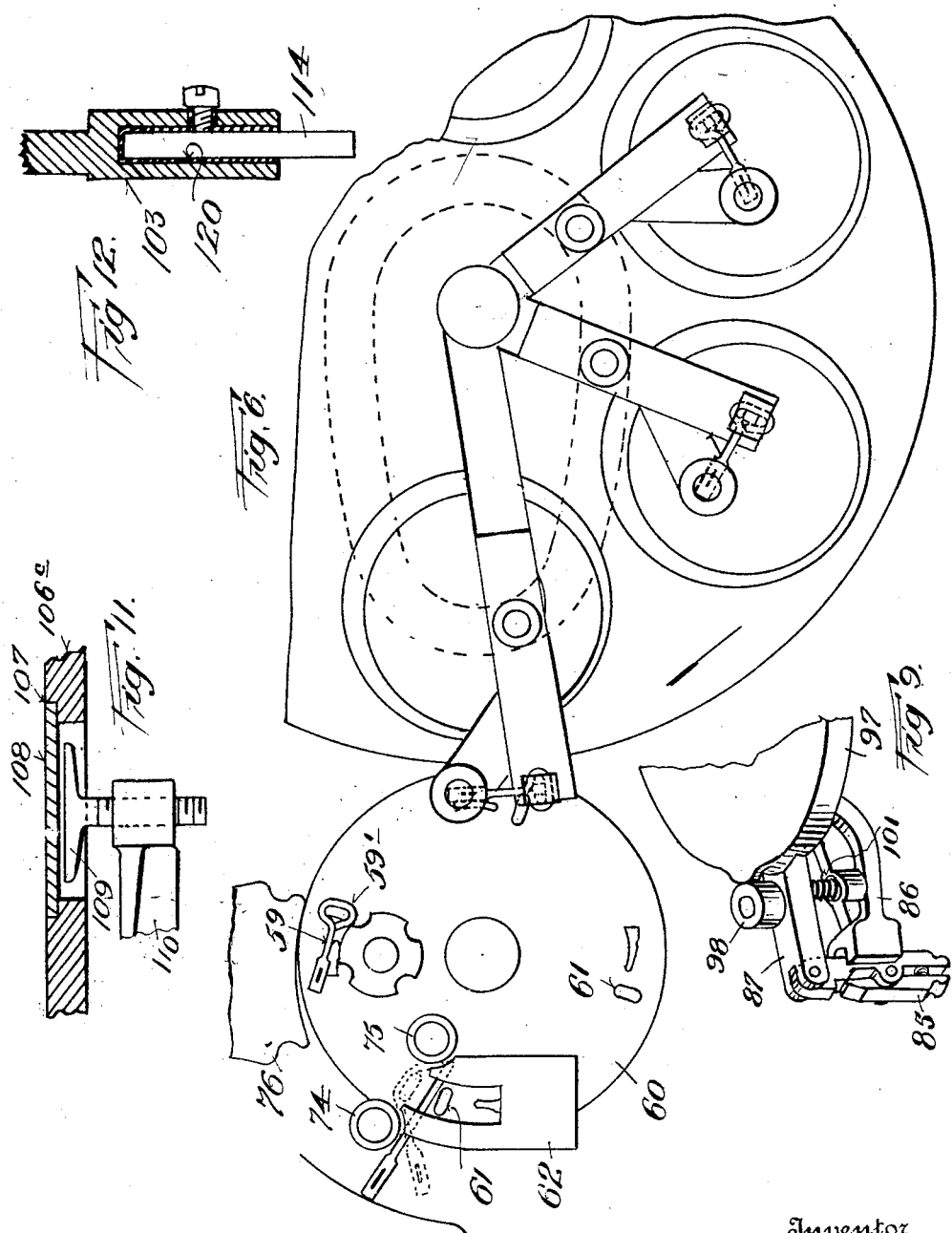

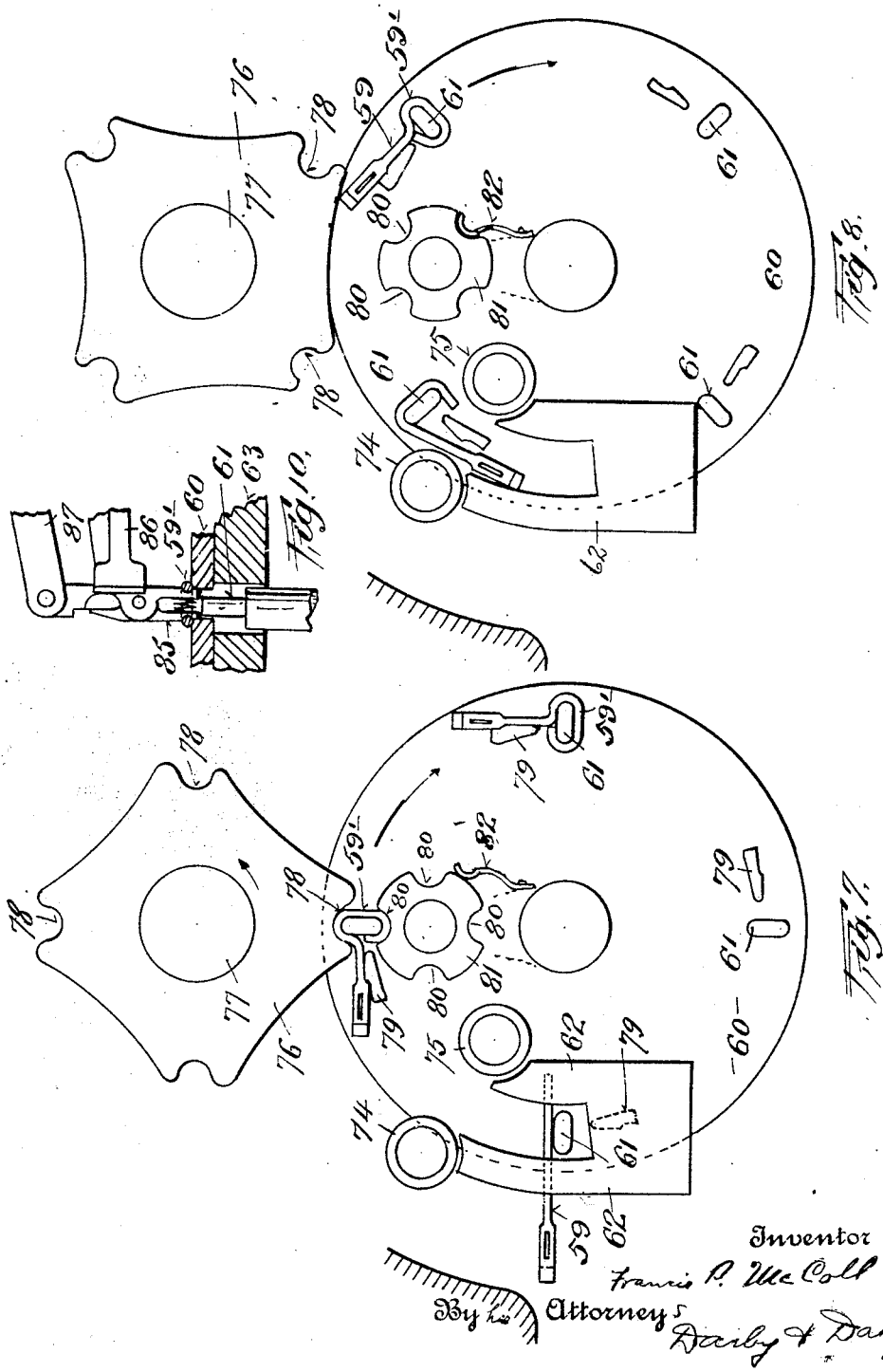

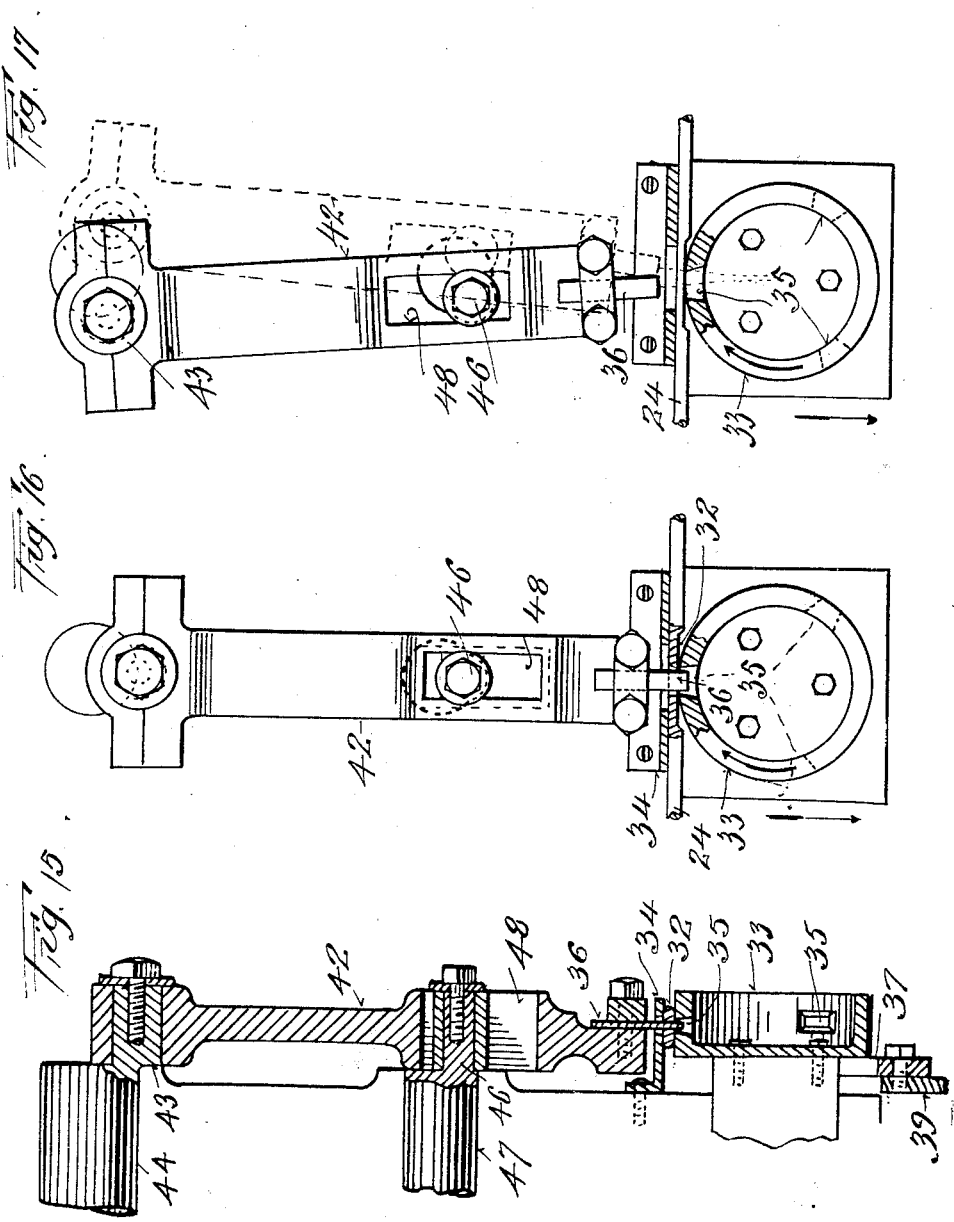

Patented May 15, 1928.

1,669,833

UNITED STATES PATENT OFFICE.

FRANCIS P. McCOLL, OF RIDGEWOOD, NEW JERSEY.

MACHINE FOR AND METHOD OF MAKING CAN-OPENING KEYS AND ATTACHING THE SAME.

Application filed April 6, 1925. Serial No. 21,256.

In its broader aspect, my invention contemplates the production of mechanism for performing a series of acts upon a constantly moving material to thereby transform said material into a finished product which may further be also applied in place on the article with which it is to be used.

In its more specific application, my invention relates to key-making and key-attaching machines and in its more specific application has as an object the production of can opening keys which are formed and attached directly to the package or to the can cover without the intervention of an operator or touch of the human hand. That is to say, I aim to produce a key-making and key-attaching machine which is automatic in all of its operations and wherein there are no abrupt or intermittent movements of the parts of the machine or of the materials upon which the machine operates.

To accomplish these objects I utilize a new mode of operation, as will be explained and set forth more fully hereinafter.

Other objects will appear herein and I attain these objects by the construction illustrated in the accompanying drawings, in which:—

Fig. 6 is a plan view showing the key forming disk and mechanism which cooperates therewith.

Figs. 7 and 8 are plan views of the key forming and shaping parts shown in different positions.

Fig. 9 is a view in perspective of the key gripping finger.

Fig. 10 is a view partially in section of the forming plate and the key holding dowel at about the instant when the key is picked up from the forming plate.

Fig. 11 is a view in section showing the cover holding plate and its ejector.

Fig. 12 is a view partly in section of the welding or soldering tool and holder.

Fig. 13 is a view of a can and cover showing the key attached.

Fig. 14 is a view of a portion of the can cover taken on the line 14—14 of Fig. 13.

Fig 15 is a side view partly in section showing the slot cutting mechanism.

Fig. 16 is a front elevation thereof.

Fig. 17 shows the two opposite extreme positions.

Like numerals refer to similar parts throughout the several views.

Figure 1:
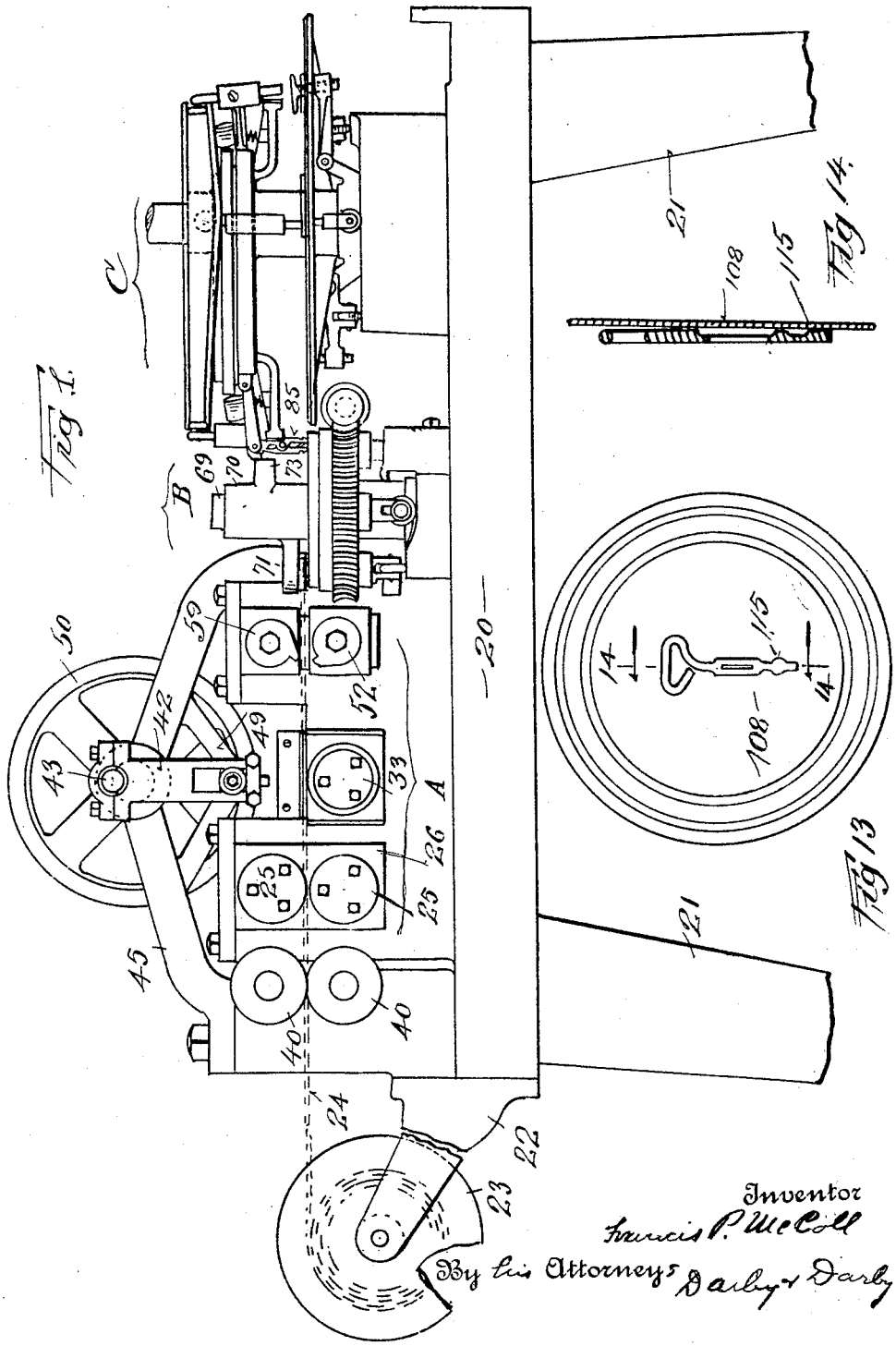
Fig. 1 is a side elevation of a machine which embodies the principles of my invention.
Figure 2:
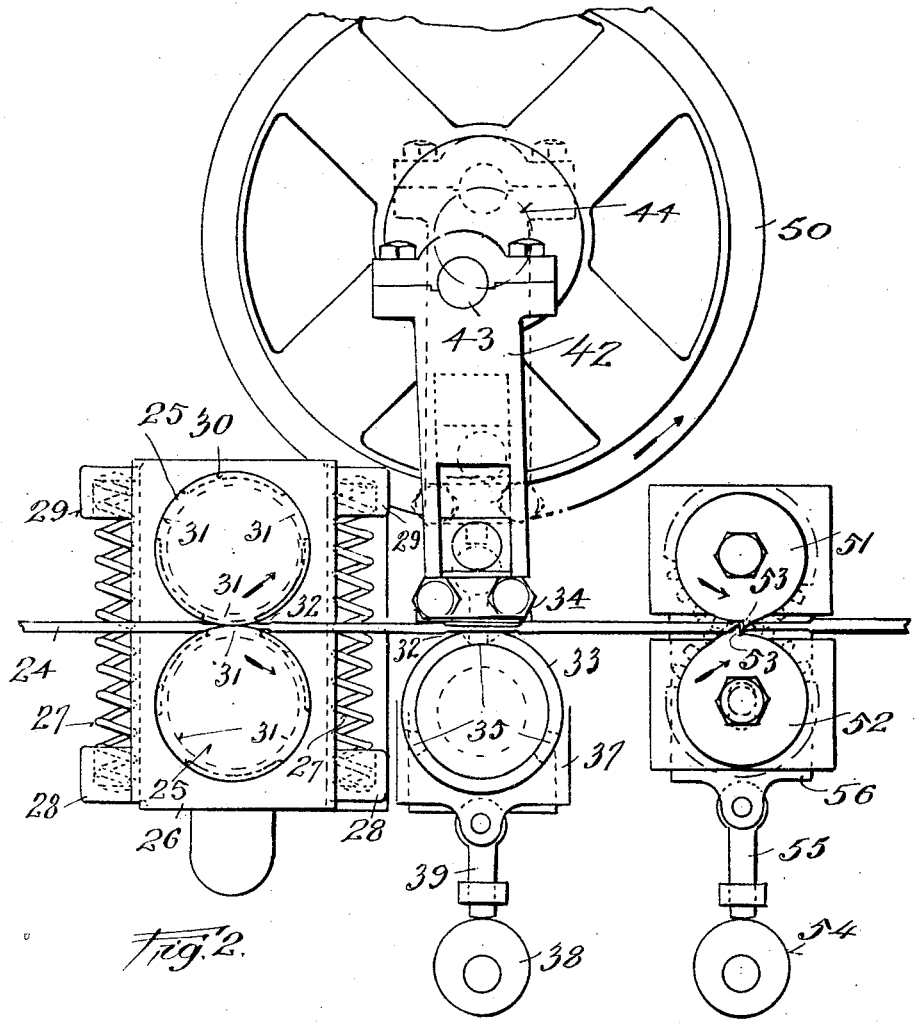
Fig. 2 is a view in elevation of the initial metal manipulating mechanism, which for purposes of identification will be known herein as the initial key forming mechanism.
Figure 3:
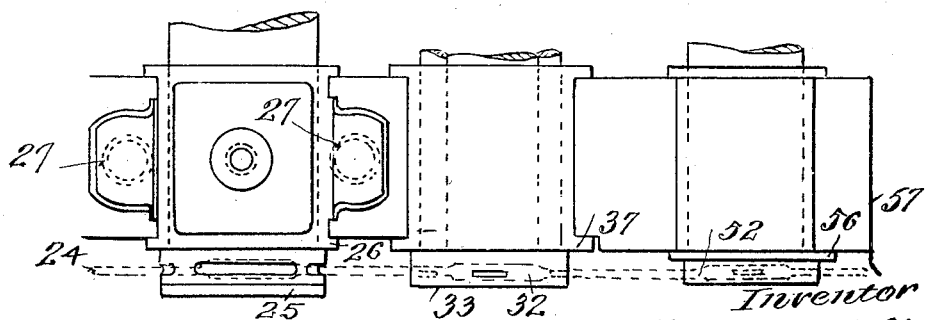
Fig. 3 is a plan view of the initial mechanism of Fig. 2.

In the manufacture of keys for opening cans it is now the practice to form the keys by stamp-punching the slots and shaping the keys. The keys thus formed are packed in barrels or kegs and shipped to the packing stations to be supplied for use with the sealed cans. This mode of distribution requires handling of the keys several times to finally place them in the containers or packages with the cans. They are usually placed with the cans loosely or they are hooked on to a portion of the can and so must be again handled separately to be finally supplied to the consumer.

By my improved machine and mode of making and applying the keys to the cans or parts of cans, I form the keys in a continuous manner without any abrupt or intermittent motions. As the keys are formed they are passed directly on to and united with or fastened on the cans or parts of the cans, which are to be later opened thereby, thus avoiding the expense incident to independent and repeated handling. To this end I provide a key making machine, into one end of which the key wire is fed and from the other end of which emerge the finished keys secured to the can, or the can cover, and ready for use so as to be easily accessible when the can is to be opened.

In carrying out my invention, I provide a machine which, for convenience, may be regarded as consisting of the initial key forming portion A, the key shaping part B and the key applying portion C. These several parts may be supported on a suitable base or frame 20 having proper supports 21. The head end of the machine is supplied with a bracket 22 on which is held a reel 23 carrying the key wire 24 or equivalent metal. This wire is fed directly between rolls 40 and 25. The latter are held in a frame 26 and are tensioned by springs 27, seated in lower and upper end pockets 28 and 29 respectively. These rolls are provided with suitable grooves 30 into which fits the wire 24. At spaced intervals in the grooves there are provided anvil surfaces 31 of suitable length and extent to flatten the wire in the manner shown at 32.

At a suitable distance from the anvil rolls I provide the slot forming or metal impressing mechanism, and next to that I provide wire cutting or metal shearing means. The distance between these units is selected for the length of the wire required for the finished key, or other article to be produced. In the construction herein shown, the key slot is formed in the flattened part of the wire. This operation is performed in a unique manner by a mechanism which permits the key wire to continue in its travel through the machine, while the necessary operation on the moving wire, or metal operated on, is performed to, in this case, produce the key slot. As the flattened portion of the wire reaches the slot forming station, it is fed between the surfaces of the rotating slotting roller or cylinder 33 and the stationary plate 34. The wire is kept moving by the combined action of the feed rolls 40 and the anvil rolls 25, and all the parts of the machine are so designed and constructed that the several functions are performed progressively without interruption of the wire in its progress or the machine in its operation.

The slotting or impression roll 33 is a hollow cylinder and is provided with openings 35 at spaced intervals, into which the impression or slot forming tool 36 is caused to descend and advance on the arc of the circle which is struck from the center of the cylinder. Cylinder 33 is carried on a slide 37 which is operated by a cam 38 and slide link 39 to cause the cylinder to be elevated into contact with the wires at about the moment when the slotting tool makes its initial contact with the flattened surface of the wire. The slotting tool 36 is carried by arm 42. This arm is pivotally mounted on an eccentric 43 of the drive shaft 44 which is supported in the frame beam 45 and operated in any suitable manner, as by pulley 50 and operating mechanism (not shown).

It is evident that the above stated manner of mounting the slotting tool arm eccentrically provides for the up and down walking motion of the slotting tool when shaft 44 is rotated. To now provide for advancing the tool in harmony with the moving wire, I provide a secondary eccentric movement appropriately spaced and timed to cause the tool to advance with the wire while the impression or slot is made. For this purpose I provide a second eccentric 46 carried on a shaft 47 of smaller diameter than shaft 44, and the eccentric is movably held in the slide 48. Shaft 47 is mounted in the branch frame 49 and the two shafts 44 and 47 are caused to rotate in unison. This construction, with that of the slotting tool arm, provides the components whereby the new and unique compound walking, rocking and advancing motion of the slotting or compression tool is produced. A complete cycle of this movement is illustrated in Figs. 1, 15, 16 and 17, where Fig. 1 shows the extreme up position, Fig. 15 is down position, while Fig. 17 shows the intermediate beginning and ending positions. By this construction of parts and arrangements of elements, I obtain what I believe to be a new mode of operation and whereby a change in material is effected without interrupting the progressive movement of the material by the agency which produces the change. In other words, the wire or metal upon which the impress or cut is made is caused to move at a constant velocity and the impressing or cutting medium is brought into moving contact with the metal without a jar or ruffle in the operating means; that is, a slot is punched, or rather pushed, through the moving wire without intermittent motions of either the tools or the materials upon which the tools operate.

After the wire is slotted or impressed, it passes through the cutting members 51 and 52 to be there cut. These members have cylindrical surfaces with cutting projections 53 oppositely arranged and so timed as to meet when the cylinders rotate and are brought together. To cut the wire the lower cylinder is raised by a cam 54 operating on a link 55 to move the cylinder carrying slide 56 up and down, as will be readily understood. The cylinder holding slides are supported in the slide frame 57 of the main machine frame.

The key wire is now flattened, slotted and cut into suitable lengths to be formed into keys. This operation is performed while the key wire lengths or blanks pass through the key shaping station which, for convenience, has been so named and is indicated on Fig. 1 by the letter B, with details thereof shown in Figs. 5, 6, 7 and 8. When the wire is cut by the cutters just described, the key blanks 59 are held in position on the key forming plate 60 and against the forming dowl 61 by the holding clips 62. The plate 60 is carried on the base plate 63 which carries the dowl heads 64 having cam rollers 65, which bear on a cam surface 66 to raise and lower the dowl pins with reference to the upper surface of the forming plate. The forming and base plates, with the dowels and their cam rollers, are driven in any suitable manner, as by a worm device 67 and worm gear 68, to rotate on a stationary axis 69. A bracket 70 is carried on and secured to axis 69 above the forming plate 60. This bracket has extensions 71, 72 and 73. Extension 71 carries the key holding clips 62, and the initial key shaping rollers 74 and 75 between the latter of which the key blank 59 is forced by the motion of the forming plate and one of the dowel pins 61. The first steps of this operation are shown by Figs. 7, 6 and 8, respectively. As the key blank is advanced by the forming plate, it is brought into contact with the head shaping mechanism. This comprises a former 76 mounted on a drive shaft 77 to move in timed relation with the key forming plates 60 and 63. It will be noted that former 76 is provided with shaping notches 78 into which the key head wire is forced while the end of the key is lodged against the key stop 79 on the plate 60. At the same time, the head end of the wire is closed around the dowl by being engaged with the head closing surface 80 on the star wheel 81. This wheel is carried on arm 72 of bracket 70 and is held by clip 82 against free rotation. The key has now been formed and its course of travel has not been interrupted. The key now reaches the position where it is released from the dowel and forming plate and picked up to be transferred into position on the can cover or can, to be fastened thereon by either spot-welding or by soldering.

As the completed key reaches the position opposite the key applying station C, the dowel pin is withdrawn from the key head 59' by reason of the cam surface being lowered because the withdrawing cam roller 83 engages the cam surface 84. At the same time that the dowel is withdrawn from the key head 59' the key picking fingers 85 are inserted to pick up the key and place it in position for fastening to the can element.

Figure 4:
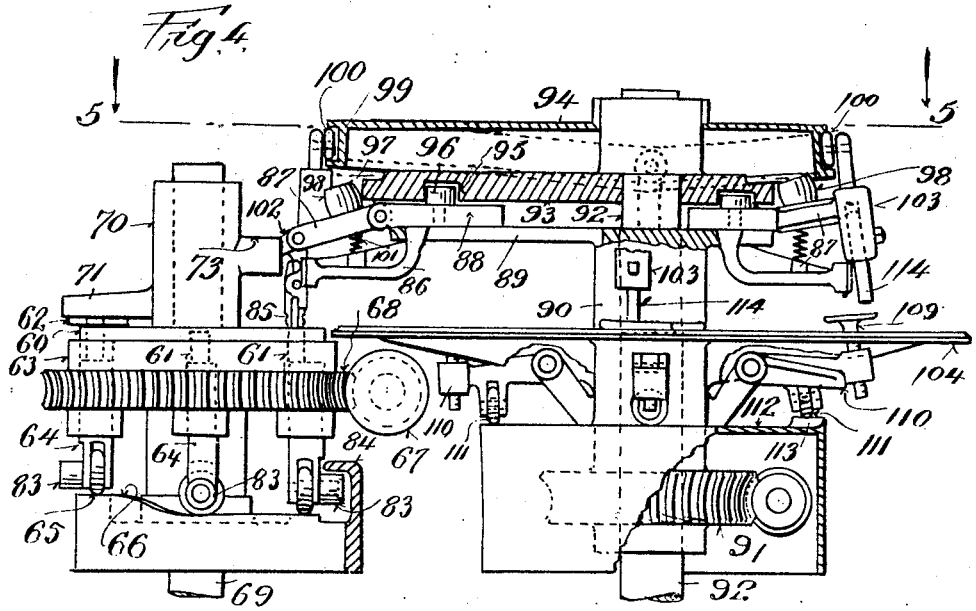
Fig. 4 is an elevation of the key shaping and key attaching portion of my machine.
Figure 5:
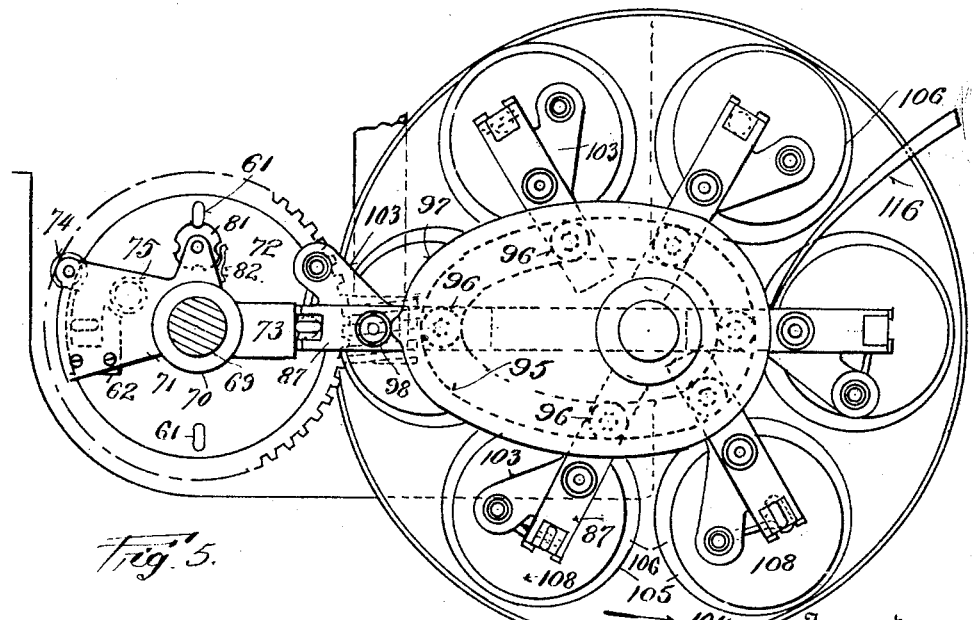
Fig. 5 is a plan view taken on the line 5—5 of Fig. 4.

The key picking fingers 85 are carried on arms 86 and 87 of the slide bar 88. This slide bar is one of several similar constructions that are slidably carried by the rotating positioning plate 89 on the rotating hollow shaft 90. This shaft is suitably driven from a worm drive 91, or equivalent means. A stationary central shaft 92 passes through the rotating shaft and plate and carries at or near its upper end the stationary cam plates 93 and 94. As is best shown by Figs. 4 and 5, these cam plates are of elliptical shape, and in the lower surface of plate 93 there is provided an elliptical cam surface 95 to receive the slide cam 96 of the slide bars 88. This cam plate is also provided with an outer cam surface 97 against which bears the cam roller 98 of the finger manipulating arm 87. The upper cam plate 94 is provided with a grooved outer cam surface 99 into which fit the cam rolls 100 for appropriately raising and lowering the key fastening means. It will be noted that the cam surface 97 sharply extends (Fig. 5) and thereby causes the key picking fingers to descend and engage the key head. A spring 101 causes said cam to constantly engage the cam surface and thereby pick up and carry the key into position, as will be stated more fully below. As a safety device, and where the fingers stick in their depressed position, I provide a positive lift. This is in the form of an extension 102 on arm 87, which extension rides up an incline of bracket 73, thereby preventing accidental sticking, of the key, to the forming plate or dowel and thus cause damage or interruption of the smoothness of operation. As the keys are carried into position by reason of the slide bar being carried along in the direction of the arrow, the carrier devices 87 are moved towards one of the elliptical foci to properly position the key. A lateral carrier arm 103 on the carrier device 87 is provided to supply the key fastening means by way of solder or spot-welding, as will be explained more fully hereinafter.

At an appropriate distance below the cam plates I provide a can cover or can carrying means. This consists of a table 104 fastened on to the hollow shaft 90 to rotate therewith. This table is provided with a number of cover or can holder seats 105 in which are received the cover or can holders 106. Each holder is provided with a recess 107 of proper diameter and dimensions to receive the can cover 108, or the can instead, if desired. By means of the cover or can holder having different sized recesses the same machine is suited for supplying keys to cans, or can covers, of different sizes. This is accomplished by merely changing the holders 106.

Beneath each cover or can holder I provide an ejecting member 109. This member consists of a plate held in the ejector arm 110 and a cam member 111 which rides on a cam surface 112. This cam surface is elevated at the discharge point 113 to eject the can, or the cover, after the key has been fastened thereto.

It will be noted that the cam surface 99 on the periphery of cam plate 94 provides a track for cam 100. This track reaches its lowest point at approximately 90° from the point of key entrance, for the purpose of bringing the electrode or soldering tool 114 on to the key end to either spot-weld or solder this part to the can or the cover, to thus affix the key, at point 115, as is shown for example by Figs. 13 and 14. Tool 114 may be insulated at 120 if desired. After the contact point just described has been passed, the cam track rises quickly, reaching its highest point at approximately 180° from the point where the key entered the rotating cover holding table. At this point the covers (or cans) are lifted by the ejector 109 to be quickly removed from the rotating table by the finger 116. The ejector member is now appropriately retracted in response to the cam surface 112, again assuming its normal elevation after having passed the elevation 113. As the table rotates, new covers (or cans) are fed on to the holders (106) from a suitable source (not shown) and at a point before reaching the key supplying point. As each cover holder, with its cover, reaches the key supplying point above described, a key is picked up and carried into position to be attached to the can cover (or the can), in the manner stated above. By the replaceable cover or can holders, containers or covers therefore of different sizes can be supplied and the keys can be centrally attached. This construction is given by way of illustration merely and not in a limiting sense, as in some instances it may be desirable to attach keys at other points. It is also apparent to those versed in the art that various modifications and specific details falling wholly within the spirit and scope of my invention will suggest themselves, and I do not therefore wish to be understood as having limited myself by the specific descriptions herein given.

What I claim, therefore, as new and useful, and of my own invention, is:

1. The combination, in a machine for forming an article from a moving piece of metal and uniting the formed article with a body on which it is to be used, of means for impressing said piece of metal and cutting the same into lengths while so moving, means for forming said lengths of impressed metal into the finished article, and means for temporarily uniting said article and the body on which it is to be used without distorting the article.

2. The combination, in a machine for forming an article from a moving piece of metal and uniting the formed article with a moving body, of means for impressing said piece of metal and cutting the same into lengths while so moving, means for forming said lengths of impressed metal into the finished article, and means for temporarily uniting said article and the body while moving in unison without distorting the article.

3. The combination, in a machine for making can opening keys and attaching said keys successively as made to parts of cans brought in contact therewith, of means for advancing a continuous wire and impressing said wire with flat sections, means for supplying said flat sections with slots while said wire is in motion, means for dividing said slotted and flatted wire into lengths having an unflattened portion, means for forming the unflattened portion of said wire lengths into a loop to form a finished key, and means to unite said key to some part of a can while said can part and key travel in the same direction.

4. The combination, in a machine for making can opening keys and attaching said keys successively as made to parts of cans brought in contact therewith, of means for advancing a continuous wire and impressing said wire with flat sections, means for slotting said flat sections without interrupting the travel of said wire, means for cutting said slotted wire into lengths to form key blanks, means to catch said key blanks and shape them into finished keys, and means to take said keys in succession as finished and affix them to a can part.

5. The combination, in a machine for making can opening keys and attaching said keys successively as made to parts of cans brought in contact therewith, of means for advancing a continuous wire and impressing said wire with flat sections, means for slotting said flat sections, means for continously moving and cutting said slotted wire into lengths to form key blanks, means to catch said key blanks and shape them into the finished keys, means to take each of said keys and attach it to a part of a can while said key and part travel in unison.

6. The combination, in a machine for making can opening keys and attaching the same to can covers by mechanism moving constantly forward in an uninterrupted manner, said mechanism comprising means for impressing key forming wire, means for cutting said wire into key blank lengths, means for looping said blanks to form keys, and means for bringing said keys into contact with said covers to unite said keys and covers.

7. The combination, in a machine for making can opening keys and attaching the same to can covers by mechanism moving constantly forward in an uninterrupted manner, said mechanism comprising means for moving a continuous length of wire through rolls having spaced anvil surfaces to flatten said wire at intervals, means for slotting said flattened parts of wire while moving, means for cutting said wire into key lengths, means for finishing said key blanks into keys, means for bringing together each successive key as finished with a can cover, and means to unite said key with said cover.

8. The combination, in a machine for making can opening keys and attaching the same to can covers by mechanism moving constantly forward in an uninterrupted manner, said mechanism comprising means for moving a continuous length of wire through rolls having spaced anvil surfaces to flatten said wire at intervals, a slotting member mounted to impress slots in said flattened wire parts while the wire continues its travel, means to cut said wire into key forming lengths, means to form said lengths into finished keys, means to pick up said keys and position them over a moving can part, means to affix said key to the can part, and means to discharge said united key and can part.

9. The combination, in a machine for making can opening keys and attaching the same to can covers by mechanism moving constantly forward in an uninterrupted manner, said mechanism comprising means for moving a continuous length of wire through rolls having spaced anvil surfaces to flatten said wire at intervals, means for slotting said flattened parts of wire while moving, means for cutting said wire into key lengths while moving at a constant rate of speed, means for finishing said key blanks into keys, means for bringing together each successive key as finished with a can cover, and means to unite said key with said cover.

10. The combination, in a machine for making can opening keys and attaching the same to can covers by mechanism moving constantly forward in an uninterrupted manner, said mechanism comprising means for moving a continuous length of wire through rolls having spaced anvil surfaces to flatten said wire at intervals, a slotting member mounted to impress slots in said flattened wire parts while the wire continues its travel, means to cut said wire into key forming lengths, means to form said lengths into finished keys, said key finishing means including a rotatably mounted table having apertures at spaced intervals, dowels in said apertures, means to move said dowels in said apertures to project above said table surface, means to engage the key forging wire lengths, means co-acting with said table and dowels to bend a part of said wire length about said dowels to form key heads, means to withdraw said dowels from the key heads, and means to pick up said keys and place each key over a can cover, and means to unite a portion of said key to the cover.

11. In a key forming and key attaching machine, an initial key forming mechanism comprising a series of rolls mounted to move at a constant speed, one of said rolls being provided with means for receiving a slot cutting tool, means for causing the tool to descend upon said receiving means and advancing therewith while completing its function, and a pair of rolls having cutting surfaces, one of said rolls being movable in a horizontal plane to cause said cutting surfaces to become effective while said pair of rolls is rotating in unison.

12. The method of forming a key and attaching the same to a package body as the key is formed, which comprises moving a wire at a uniform rate of speed and while so moved impressing the wire at repeated intervals, then separating the impressed portions and shaping said separated portions into a finished key, and then attaching a small part of said key to the package body on which it is to be used.

13. The method for forming can opening keys and securing the same in position, which comprises moving a wire and while so moving forming flattened faces on said wire, then slotting said faces, then forming said wire into lengths, then shaping said lengths into loops to form a key, and attaching said key as formed.

14. The method of forming keys and soldering said keys at one portion to a can element, which comprises impressing a key blank stock and slotting said impressed part without interrupting its course of travel, and then forming said blank stock into keys and attaching said keys to a can element as quickly as they are formed.

15. The method of forming slots in a moving blank which comprises applying a slot forming tool to a moving blank and advancing said tool with the moving blank while it descends into the blank to form the slot and so continue its advancing movement with the blank while it is withdrawn therefrom.

In testimony whereof I have hereunto set my hand on this 2nd day of April, A. D., 1925.

FRANCIS P. McCOLL.